Sept. 9, 1952            J. S. BELL           2,610,227
METHOD AND APPARATUS FOR MEASURING EFFECTIVE RESISTANCE
Filed April 21, 1948
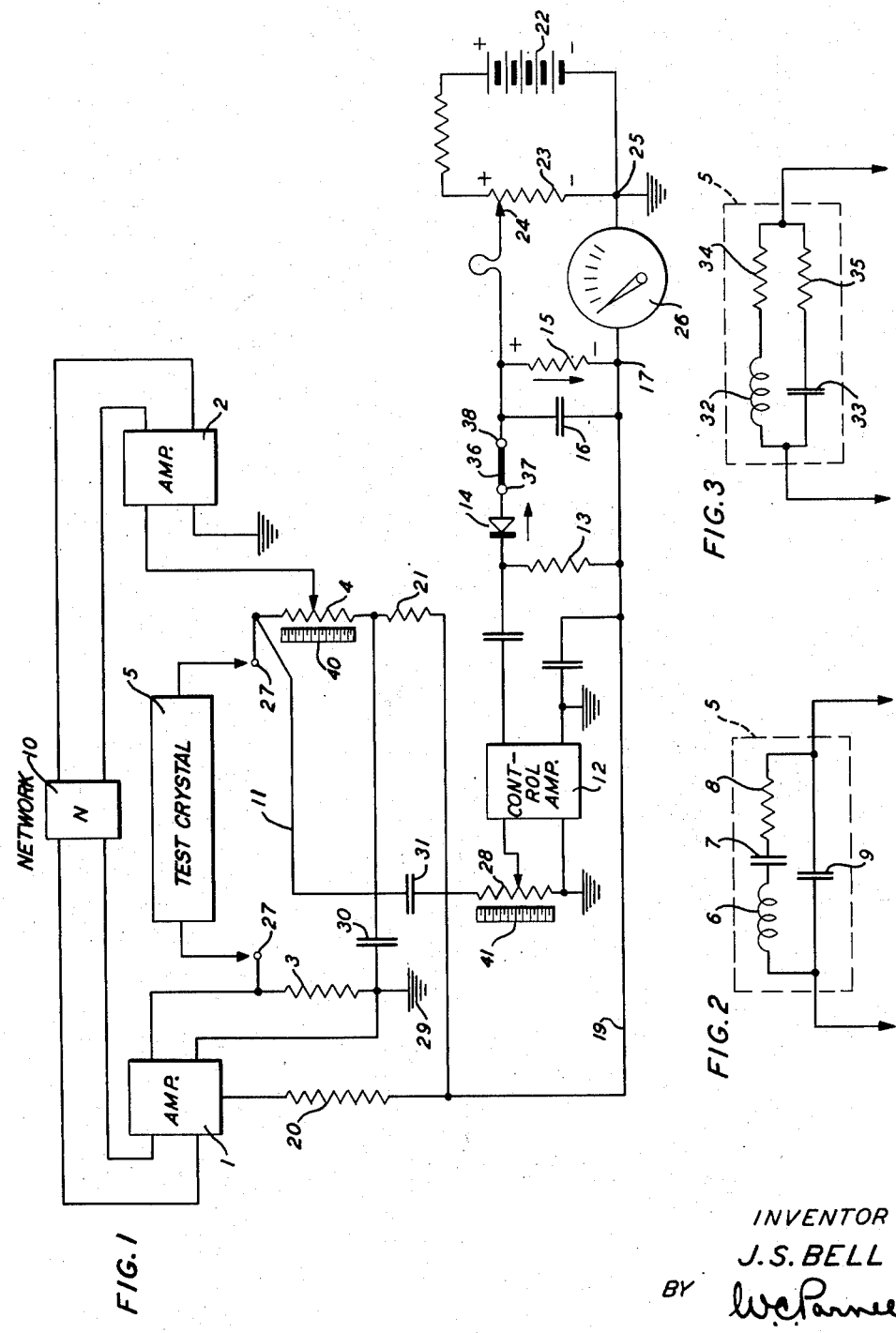
INVENTOR
J. S. BELL
BY *W. C. Parnell*
ATTORNEY Patented Sept. 9, 1952

2,610,227

UNITED STATES PATENT OFFICE 2,610,227

METHOD AND APPARATUS FOR MEASURING EFFECTIVE RESISTANCE

James S. Bell, Scotch Plains, N. J., assignor to Western Electric Company, Incorporated, New York, N. Y., a corporation of New York Application April 21, 1948, Serial No. 22,457

7 Claims. (Cl. 175—183)

This invention relates to the measurement of resistance, and particularly to methods and apparatus for determining the resistance of complex electrical elements such as piezoelectric crystals.

When, for example, such crystals are used as components of electric filters, they must have very high "Q," and for such uses the effective resistance of a crystal is one criterion of its quality. It therefore has been the practice to measure the effective resistance of crystals, and in the case of crystals for filters, this measurement is made at the frequency of interest which is the series resonant frequency of the particular crystal under test.

One known method of making these measurements is to connect the crystal as the series element of a network having shunt input and output resistors and apply across the input resistor a known, closely regulated potential of the series resonant crystal frequency. The effective resistance of the crystal is then determined in terms of the potential drop across the output resistor. This procedure involves the repeated adjustment of the frequency of the applied potential to the proper value for each crystal and the accuracy of measurement depends, of course, on the accuracy and stability of the frequency source and the effectiveness of the potential regulation.

The object of this invention is to simplify the procedure and increase the testing speed in determining the effective resistance measurement of complex circuit elements, such as piezoelectric crystals.

According to the invention, the crystals or other elements to be tested are subjected to alternating current of the frequency at which their resistance is to be measured and the current through each element is regulated to a known constant value which is independent of the impedance constants of the element. The amount of regulating control required to maintain the current constant for any element then becomes a measure of the effective resistance of that element at its own resonant frequency.

When effective resistance is to be measured at a predominant resonant frequency, and particularly when this frequency is the series resonant frequency, the crystals or other elements may be connected serially in the feedback loop of an oscillator to serve successively as the frequency determining element of the oscillator so that the oscillator frequency is automatically adjusted to the proper value for each resistance measurement.

As a more general case, the current through the crystal or other complex element, may be regulated less closely but yet sufficiently so that, while the regulating control varies with the crystal resistance at a different proportionality rate, each value of regulating control still corresponds to a unique value of crystal resistance. One circuit which is adaptable to the purposes of the invention is of the general type disclosed in my co-pending application, Serial No. 788,501, filed November 28, 1947, in which a crystal controlled oscillator of the R-C type is provided with an automatic gain control amplifier for regulating the oscillating current to protect the crystal. In a modified circuit of this type, a meter may be connected to indicate the control potential applied to the tubes of the oscillator, and this meter may be calibrated to read directly in terms of the effective resistance of the crystal controlling the oscillator frequency.

In the drawing, Fig. 1 is a schematic diagram of a testing apparatus according to the invention; Fig. 2 is a schematic of a complex element, such as a piezoelectric crystal, at series resonance; and Fig. 3 is a schematic of a complex element, such as a crystal, a tuned circuit, or an inductive winding having distributed capacity, at parallel resonance.

In Fig. 1 of the drawing, conventional amplifiers 1 and 2 are coupled by a network comprising a shunt resistor 3 in the output of amplifier 1, a potentiometer 4 in the input of amplifier 2, and a series connecting element 5, the effective resistance of which is to be determined. The effective resistance of element 5 may be measured at either its series or its parralel resonance frequency. In all such elements there are various power losses, and the term "effective resistance" is used herein in its usual sense to mean the value of resistance which would introduce the same total power loss in the circuit as the complex element at the same frequency. The invention will be described first as applied to the measurement of the effective resistance at series resonance of elements, such as piezoelectric crystals. Each such crystal has electrical characteristics which may be represented, as shown in Fig. 2, by an inductance 6, a capacitance 7, and a resistance 8, all in series, and a second capacitance 9 in parallel with this series combination. In this network, 8 represents the effective resistance of the crystal, the value of which is to be determined at the series resonant frequency of the crystal. The output of the amplifier 2 is connected back directly, or through any suitable network 10, to the input of amplifier 1 to complete a regenerative feedback path, so that the circuit oscillates at a frequency determined by the series resonant frequency of the particular crystal connected to the terminals 27.

When the circuit is oscillating, the potentials developed across potentiometer 4 are proportional to the current through the crystal, and this current therefore may be regulated by controlling the gain of either or both of the amplifiers 1 and 2 according to the magnitude of these potentials. These alternating potentials are impressed over conductor 11 on the input of a control amplifier 12 and appear in amplified form across resistor 13. A suitable rectifier 14, poled to conduct in the direction indicated, is connected across resistor 13 in series with a resistor 15, which is by-passed by a condenser 16, so that the oscillating potentials across potentiometer 4 produce in resistance 15 a direct current which is proportional to the alternating current through the crystal 5. The negative end 17 of the resistance 15 is connected by a conductor 19 through suitable resistors 20 and 21 to the amplifiers 1 and 2 where the potentials across resistor 15 are used as a negative grid bias to control the gain of the amplifiers. To make this bias effective on the grid of amplifier 2, the potentiometer 4 is connected to ground at 29 through a high frequency by-pass condenser 30, and the conductor 11 is connected to the input of the control amplifier 12 through a blocking condenser 31.

In order to make this automatic gain control very sensitive to changes in the potential across potentiometer 4, the potential developed across resistor 15, with a crystal of predetermined effective resistance in the circuit, is balanced out by an opposing static potential which may be derived from a battery 22 and adjusted to the proper value by a potentiometer 23, as shown. Then as the crystal current varies from its proper value, potentials representing the change in crystal current will be effective to increase or decrease the bias on the amplifiers as required. The grid circuits of the controlled tubes of the amplifiers are then subjected to a gain reducing bias which is the difference between the negative potential across resistor 15 and the positive potential across the portion of potentiometer 23 between the point 24 and the grounded point 25. A volt meter 26, connected between points 17 and 25, therefore indicates the amount of gain control potential being applied at any time to the oscillator.

If, for example, the maximum effective resistance of any of the crystals to be tested is 1000 ohms, the circuit may be calibrated as follows: A known resistance of 1000 ohms is connected between points 27 in lieu of a crystal and with the circuit oscillating, the adjustable connection 24 of potentiometer 23 is adjusted until the meter 26 reads zero. Then when any crystal having effective resistance of less than 1000 ohms is substituted for the standard resistance, the loss in the feedback loop is decreased and the current through the crystal connected to points 27 tends to increase, thereby increasing the potential across potentiometer 28 and the input to the control amplifier. The potential across resistor 15 therefore increases and the resulting net negative bias on the tubes reduces the gain around the loop to restore the crystal current to the value through the standard resistance during calibration.

The meter then indicates this increase in the control potential and gives a unique reading for each value of crystal resistance of 1000 ohms or less. It therefore is apparent that by connecting a succession of standard resistors to terminals 27 and noting the reading of meter 26 in each case, the meter may be calibrated directly in terms of the effective resistance of crystals to be tested. When this is done, the effective resistance of miscellaneous crystals may be measured in quick succession, each at its series resonant frequency, merely by connecting them in turn to the points 27 and noting the meter reading in each case. In calibrating the meter, or in restoring the original relationship between the potential applied to the meter and the effective resistance being measured, the plate and screen potentials on the tubes of the amplifiers may be adjusted as required.

When the potential across potentiometer 4 is regulated to a constant value independently of the particular crystal in circuit, as described above, the close regulation necessary for accurate measurement requires a high gain capacity in the control amplifier 12. The cost of this amplifier and the operating difficulties incident to the use of high gain circuits may be greatly reduced by using an amplifier of smaller gain capacity. In this case, since the amplifier is incapable of maintaining the crystal current constant, the potential across potentiometer 4 will increase progressively as crystals of lower effective resistance are tested. The negative control potential indicated by the meter 26 still varies with the effective resistance of the crystal under test but at a different proportionality rate. It therefore is still possible to calibrate the meter directly in ohms of effective crystal resistance, but the scale will be shifted and less uniform than with close regulation. The amount by which the potential across potentiometer 4 is permitted to vary will be determined by the requirements of the particular case, but, in general, this potential may vary over any range within which the control potential continues to vary in the same direction with changes in crystal resistance at a rate which gives a usable scale.

If desired, the circuit may be calibrated by first connecting to terminals 27 a resistor of the minimum value to be measured and then adjusting the contact 24 until the meter reads a maximum of net negative bias voltage. In this case, when a crystal of higher resistance is connected into the circuit, the attenuation around the feedback loop is increased and the crystal current tends to decrease, thereby decreasing the input to the control amplifier. The potential drop across resistor 15 and the negative bias on the amplifier tubes therefore decrease and the gain of the amplifiers increases to maintain the crystal current either constant or within the prescribed limits as before. When using the circuit in this manner, it will be understood that the range of resistance values which may be measured is limited to its upper end by the fact that the oscillator becomes unstable when the bias on the grids approaches a positive value. In other words, when minimum crystal resistance produces maximum negative bias across resistors 15, higher resistance values are measured by working the circuit toward decreasing stability, whereas in the prior case, the initial net control voltage is fixed for maximum crystal resistance and the circuit operates in the direction of increasing stability.

In some cases it may be advantageous to combine these operating features by using a zero center meter and adjusting contact 24 to bring the meter to its zero position when using a calibrating resistor of some intermediate value within the resistance range of the crystals to be measured. In this type of circuit the meter hand moves to one side or the other of its normal zero position, depending on whether the particular crystal being measured has a resistance greater or less than the intermediate value used for initial calibration. As in the methods of calibration previously described, however, the meter scale may be calibrated directly in ohms of crystal resistance reading from maximum to minimum resistance as the meter hand moves from left to right, as in the case of an ordinary ohmmeter.

Ideally, of course, the gains of the control amplifier and of the amplifier stages of the oscillator should be exactly the same for all frequencies at which crystals are to be tested. This may be impracticable, particularly when the apparatus is to be used over a wide band of frequencies. In any case, however, amplifiers having a gain characteristic which varies with frequency may be used without impairing the accuracy of measurement by adjusting the gain prior to each test as required. In the circuit shown, for example, the potentiometer 4 in the feedback loop may be used to adjust the gain at any frequency to the minimum value for the band of interest. Similar gain adjustments of the control amplifier 12 may be made by means of potentiometer 28. These potentiometers may be used also to adjust the gain of the amplifiers to compensate for gain changes due to aging of tubes or other causes. For convenience of operation, such potentiometers may be provided with scales 40 and 41 calibrated in terms of frequency so that they may be adjusted quickly to the proper setting for each crystal to be measured.

While the invention has been described with reference to the measurement of effective resistance at series resonance, it is applicable also to making such measurements at parallel resonance of elements having very low "Q" such, for example, as wire wound resistors. At parallel resonance a complex element has electrical characteristics, as shown in Fig. 3, wherein 32 is the inductance and 33 is the capacitance of the element. At resonance the effective resistance to be measured is the value of the parallel combination of the principal resistance 34 and resistance 35 which may be due, for example, to the imperfect dielectric properties of the insulation. Since the tuning at parallel resonance usually is quite broad, it may not be practicable to rely entirely on the element as the frequency determining means. In such cases the tuning may be sharpened, if desired, by means of any adjustable tuning network which may be incorporated within the network 10.

The meter 26 preferably is connected, as shown, but strap 36 may be removed and the meter inserted between terminals 37 and 38. In this position the meter is always carrying at least current due to the contact potential of the rectifier. If the full scale of the meter is to be used, it still will be necessary therefore to provide some opposing potential from the source 22. In either case, if desired, the meter may have a second scale for indicating the control voltage being applied to the amplifiers.

It is to be understood that the above-described methods and circuits are simply illustrative of the application of the principles of the invention. Various other possible modifications of these methods and circuits, embodying the principles of the invention and falling within its spirit and scope, will occur to those skilled in the art.

What is claimed is:

1. In apparatus for measuring the effective resistance of a complex element, means for subjecting the element to an oscillating current of the frequency at which the resistance is to be measured, means responsive to the magnitude of said oscillating current for automatically regulating the current to a predetermined value and means connected to said regulating means and calibrated in units of element resistance for measuring the amount of regulation required to establish the current at the predetermined value.

2. The method of measuring the effective resistance of a complex element at its resonant frequency which comprises subjecting the element to oscillating current of its resonant frequency, controlling the frequency of the oscillating current by the element, regulating the current through the element to a predetermined value and measuring the effective resistance of the element in terms of the amount of regulation required to establish the predetermined value of current through the element.

3. In apparatus for measuring the effective resistance of complex elements, a main amplifier having input and output circuits, a regenerative feedback path connecting the output circuit to the input circuit to form a feedback loop for producing oscillations, terminals for connecting a complex element having a predominant resonant frequency serially in the loop to fix the frequency of the oscillations at the series-resonant frequency of the element, a control amplifier having an input circuit connected across the feedback loop and an output circuit, including a rectifier, a resistor in series with the rectifier for producing a unidirectional potential drop proportional to the current in the feedback loop, circuit connections for regulating the gain of the main amplifier in accordance with the potential drop, and a meter calibrated in terms of resistance of the element, said meter being connected to the resistor.

4. Apparatus according to claim 3 in which the gain of at least one of the amplifiers varies with frequency, in combination with means calibrated in terms of frequency over the band of interest for setting the effective gain of the amplifier at any frequency within the band to the minimum gain of the amplifier over the band to maintain a constant relation between the indications of the meter and the effective resistance of the elements connected into the feedback loop.

5. In apparatus for measuring the effective resistance of piezoelectric crystals at their series-resonant frequencies, the combination with a main amplifier having output and input circuits connected together to form a regenerative feedback loop including a shunt resistor and terminals for the series connection in the loop of crystals to be tested, and a control amplifier having an input circuit connected across the resistor and an output circuit including a rectifier and a second resistor for developing direct current potentials proportional to the current through the crystal under test, of connections between the second resistor and the main amplifier for regulating the gain of the main amplifier to establish a known proportionality between the direct current potentials and the effective resistance of the crystal, and means for measuring the potentials.

6. In apparatus for measuring the effective resistance of complex elements at their resonant frequencies, a circuit including means for producing oscillations at the resonant frequency of the element to be measured, said circuit having a feedback loop including means for serially connecting a complex element thereto, means connected to said feedback loop for automatically regulating the current therein in response to the magnitude of said current, and a meter connected to said regulating means calibrated to measure the effective resistance of the element in terms of the output of said regulating means.

7. In apparatus for measuring the effective resistance of complex elements, an amplifier having input and output circuits, a regenerative feedback path connecting the output circuit to the input circuit to form a feedback loop for producing oscillations, terminals for connecting a complex element having a predetermined resonant frequency serially in the loop to fix the frequency of the oscillations at the series-resonant frequency of the element, means for regulating the gain of the amplifier in accordance with the magnitude of the current in the feedback loop, and a meter connected to the output of said regulating means calibrated in terms of the resistance of the element.

JAMES S. BELL.

REFERENCES CITED

The following references are of record in the file of this patent:

UNITED STATES PATENTS

| Number | Name | Date |
|---|---|---|
| 2,111,235 | Avins | Mar. 15, 1938 |
| 2,400,895 | Wachtman | May 28, 1946 |
| 2,448,581 | Fair | Sept. 7, 1948 |